(12) United States Patent
Hu

(10) Patent No.: US 10,796,621 B2
(45) Date of Patent: Oct. 6, 2020

(54) METHOD FOR PROCESSING DATA, DISPLAY DEVICE AND COMPUTER READABLE STORAGE MEDIUM

(71) Applicants: Chongqing HKC Optoelectronics Technology Co., Ltd., Chongqing (CN); HKC Corporation Limited, Shenzhen, Guangdong (CN)

(72) Inventor: Shuixiu Hu, Chongqing (CN)

(73) Assignees: Chongqing HKC Optoelectronics Technology Co., Ltd., Chongqing (CN); HKC Corporation Limited, Shenzhen (CN)

(*) Notice: Subject to any disclaimer, the term of this patent is extended or adjusted under 35 U.S.C. 154(b) by 0 days.

(21) Appl. No.: 16/245,465

(22) Filed: Jan. 11, 2019

(65) Prior Publication Data

US 2020/0090573 A1    Mar. 19, 2020

Related U.S. Application Data

(63) Continuation of application No. PCT/CN2018/111806, filed on Oct. 25, 2018.

(30) Foreign Application Priority Data

Sep. 14, 2018   (CN) .......................... 2018 1 1072395

(51) Int. Cl.
*G09G 5/02* (2006.01)
*G09G 3/20* (2006.01)
*H04N 9/73* (2006.01)
*G09G 3/36* (2006.01)

(52) U.S. Cl.
CPC ............. *G09G 3/2003* (2013.01); *G09G 3/36* (2013.01); *H04N 9/73* (2013.01); *G09G 2320/0666* (2013.01); *G09G 2320/0693* (2013.01)

(58) Field of Classification Search
CPC .... G09G 5/02; G09G 5/06; G09G 2320/0666; G09G 2340/06; G06T 11/001
USPC ........................................................ 345/589
See application file for complete search history.

(56) References Cited

U.S. PATENT DOCUMENTS

| | | | |
|---|---|---|---|
| 2002/0071041 A1 | 6/2002 | Pine | |
| 2009/0002550 A1* | 1/2009 | Kimura | .................... H04N 9/67 348/441 |
| 2011/0128438 A1* | 6/2011 | Yamashita | ................ G06T 1/00 348/384.1 |
| 2013/0266062 A1* | 10/2013 | Dambrackas | ........ H04N 19/105 375/240.08 |

FOREIGN PATENT DOCUMENTS

| | | |
|---|---|---|
| CN | 101740000 A | 6/2010 |
| CN | 102959956 A | 3/2013 |
| CN | 107863080 A | 3/2018 |

* cited by examiner

*Primary Examiner* — Gordon G Liu

(57) ABSTRACT

The present disclosure discloses a method for processing data, the method for processing data comprises the following steps: acquiring color data of a display device, and reading a gray scale data of the color data in a first preset format; reading the gray scale data of the color data in the first preset format and a second preset format after the display device enters white tracking adjustment.

11 Claims, 7 Drawing Sheets

| 8bit | | | | 10bit | | |
|---|---|---|---|---|---|---|
| 0 | 0 | 0 | | 0 | 0 | 0 |
| 1 | 1 | 1 | | 8 | 6 | 6 |
| 2 | 2 | 2 | | 11 | 10 | 9 |
| 3 | 3 | 3 | | 14 | 13 | 12 |
| 4 | 4 | 4 | | 18 | 15 | 14 |
| 5 | 5 | 5 | | 21 | 18 | 17 |
| 6 | 6 | 6 | | 25 | 21 | 20 |
| 7 | 7 | 7 | | 28 | 24 | 23 |
| 8 | 8 | 8 | | 31 | 28 | 25 |
| ... | ... | ... | | ... | ... | ... |
| ... | ... | ... | | ... | ... | ... |
| ... | ... | ... | | ... | ... | ... |
| 248 | 248 | 248 | | 1003 | 987 | 977 |
| 249 | 249 | 249 | | 1006 | 991 | 980 |
| 250 | 250 | 250 | | 1008 | 995 | 985 |
| 251 | 251 | 251 | | 1010 | 999 | 980 |
| 252 | 252 | 252 | | 1012 | 1003 | 1000 |
| 253 | 253 | 253 | | 1013 | 1008 | 1000 |
| 254 | 254 | 254 | | 1014 | 1012 | 1000 |
| 255 | 255 | 255 | | 1016 | 1016 | 1010 |

| 8bit | | | | 5bit | | |
|---|---|---|---|---|---|---|
| 0 | 0 | 0 | | 0 | 0 | 0 |
| 1 | 1 | 1 | | -4 | -2 | -2 |
| 2 | 2 | 2 | | -3 | -2 | -1 |
| 3 | 3 | 3 | | -2 | -1 | 0 |
| 4 | 4 | 4 | | -2 | 1 | 2 |
| 5 | 5 | 5 | | -1 | 2 | 3 |
| 6 | 6 | 6 | | -1 | 3 | 4 |
| 7 | 7 | 7 | | 0 | 4 | 5 |
| 8 | 8 | 8 | | 1 | 4 | 7 |
| ... | ... | ... | | ... | ... | ... |
| ... | ... | ... | | ... | ... | ... |
| ... | ... | ... | | ... | ... | ... |
| 248 | 248 | 248 | | -11 | 5 | 15 |
| 249 | 249 | 249 | | -10 | 5 | 16 |
| 250 | 250 | 250 | | -8 | 5 | 15 |
| 251 | 251 | 251 | | -6 | 5 | 24 |
| 252 | 252 | 252 | | -4 | 5 | 8 |
| 253 | 253 | 253 | | -1 | 4 | 12 |
| 254 | 254 | 254 | | 2 | 4 | 16 |
| 255 | 255 | 255 | | 4 | 4 | 10 |

After entering the white tracking, according to the converted gray scale data of the color data, enhancing the brightness of a red sub-pixel, and reducing the brightness of a blue sub-pixel — S50

FIG. 10

METHOD FOR PROCESSING DATA, DISPLAY DEVICE AND COMPUTER READABLE STORAGE MEDIUM

CROSS REFERENCE TO RELATED APPLICATIONS

The present application is a Continuation Application of PCT Application No. PCT/CN2018/111806 filed on Oct. 25, 2018, which claims the benefit of Chinese Patent Application No. 201811072395.0 filed on Sep. 14, 2018. All the above are hereby incorporated by reference.

FIELD

The present disclosure relates to the field of display technologies, and in particular, to a method for processing data, a display device, and a computer readable storage medium.

BACKGROUND OF THE DISCLOSURE

Along with the continuous improvement of science and technology, increasing number of equipment with a display device enters the daily life and work of people, such as television, mobile phone, and the like. The reason why a thin film transistor-liquid crystal display (TFT-LCD) is able to display different colors and images is that a plurality of R (red), G (green), and B (blue) sub-pixels are arranged in a panel, and the three sub-pixels can display different colors at different brightness. Due to the fact that the wavelength of the blue light is short, the attenuation of the B sub-pixels is relative smaller than that of the R sub-pixels and the G sub-pixels, as a result that a displayed image is cold, and the cold tone is not suitable for being watched by Asian people. Therefore, a white tracking (WT) technology can be used to enhance the brightness of the R sub-pixels and to reduce the brightness of the B sub-pixels so as to weaken the status of cold image.

Currently, the white tracking technology is realized by a method adopting 8 bit and 10 bit. However, the method occupies internal storage space of a driving integrated circuit (IC) and increases the data processing work of the driving IC.

In conclusion, the occupied storage space is large when adopting a storage mode of the current white tracking, and the calculation difficulty of the driving IC is increased, which leads to poor processing efficiency of the driving IC.

SUMMARY

The present disclosure mainly aims to provide a method for processing data, a display device, and a computer readable storage medium. The present disclosure aims to solve the problem that the occupied storage space is large when adopting a storage mode of the current white tracking, which will increase the calculation difficulty of a driving IC, which further leads to poor processing efficiency of the driving IC.

In order to realize the above aim, an aspect of the present disclosure provides a method for processing data, and the method for processing data includes the following steps:

acquiring color data of a display device, and reading a gray scale data of the color data in a first preset format;

reading the gray scale data of the color data in the first preset format and a second preset format after the display device enters white tracking adjustment.

Optionally, the step of representing the gray scale data of the color data in a first preset format includes:

converting the gray scale data of the color data so as to be read in the first preset format which occupies storage space of 8 bit.

Optionally, reading the gray scale data of the color data in the second preset format which meets an occupied storage space of 5 bit.

Optionally, the data reading formula of the second preset format is $Dwt=a*Dm+d$, and a is a constant, $d \leq 32$ or $d \leq 2^5$, Dwt is the gray scale data after entering the white tracking, and Dm is the gray scale data represented in the first format.

Optionally, the step of acquiring color data of a display device includes:

determining a display mode of the current display device;

acquiring the color data of the display device, according to the display mode and a current displayed image.

Optionally, after the step of reading the gray scale data of the color data in the first preset format and a second preset format after the display device enters white tracking adjustment, so as to reduce the storage space occupied by the gray scale data of the color data, the method further includes:

determining a compression ratio of the gray scale data;

compressing the gray scale data according to the compression ratio, and storing the compressed gray scale data in a memory.

Optionally, the step of determining a compression ratio of the gray scale data includes:

acquiring a user's sensitivity of chrominance and sensitivity of brightness;

determining the compression ratio of the gray scale data, according to the sensitivity of the chrominance and the sensitivity of the brightness.

Optionally, the method further includes:

after entering the white tracking, according to the converted gray scale data of the color data, enhancing the brightness of a red sub-pixel, and reducing the brightness of a blue sub-pixel.

Optionally, the method further includes:

acquiring the color data of red sub-pixel and blue sub-pixel, and not acquiring the color data of green sub-pixel, when acquiring the color data.

Optionally, the step of reading the gray scale data of the color data in the first preset format and a second preset format after the display device enters white tracking adjustment includes:

changing a presentation manner of the gray scale data, and reading the gray scale data of the color data in the first preset format after the display device enters the white tracking adjustment, and the second preset format, to reduce the storage space occupied by the gray scale data of the color data.

Additionally, in order to realize the above aim, the present disclosure further provides a display device, the display device including: a memory, a processor, and a computer program stored in the memory and capable of running in the processor, when the computer program is executed by the processor, the steps of above-mentioned methods are realized.

Additionally, in order to realize the above aim, the present disclosure further provides a computer readable storage medium, a data processing program is stored in the computer readable storage medium, when the data processing program is executed by the processor, the above-mentioned methods for processing data are realized.

According to the present disclosure, before entering the white tracking, the gray scale data of the color data is represented through a Dm in the first preset format, and after entering the white tracking, the gray scale data is represented in the first preset format and the second preset format, which further reduces the occupied storage space and effectively avoids the problem caused by the occupied space of the driving IC, which reduces the calculation difficulty of the driving IC and improves the processing efficiency of the driving IC.

BRIEF DESCRIPTION OF THE DRAWINGS

FIG. 10 is a schematic flow diagram of a method for processing data according to another embodiment of the present disclosure.

The realizing of the aim, functional characteristics, advantages of the present disclosure are further described in detail with reference to the accompanying drawings and the embodiments.

DETAILED DESCRIPTION OF THE EMBODIMENTS

It should be understood that the specific embodiments described herein are merely used to explain the present disclosure and are not intended to limit the present disclosure.

The technical solution of the embodiment of the present disclosure is that: acquiring color data of a display device, and reading a gray scale data of the color data in a first preset format; reading the gray scale data of the color data in the first preset format and a second preset format after the display device enters white tracking adjustment.

Due to the problem that an occupied storage space is large when adopting a storage mode of the current white tracking, which will increase the calculation difficulty of a driving IC, which further leads to poor processing efficiency of the driving IC. The present disclosure provides a solution that before entering the white tracking, the gray scale data of the color data is represented through a Dm in the first preset format, and after entering the white tracking, the gray scale data is represented in the first preset format and the second preset format, which further reduces the occupied storage space and effectively avoids the problem caused by the occupied space of the driving IC, which reduces the calculation difficulty of the driving IC, and the processing efficiency of the driving IC is improved.

Figure 1:
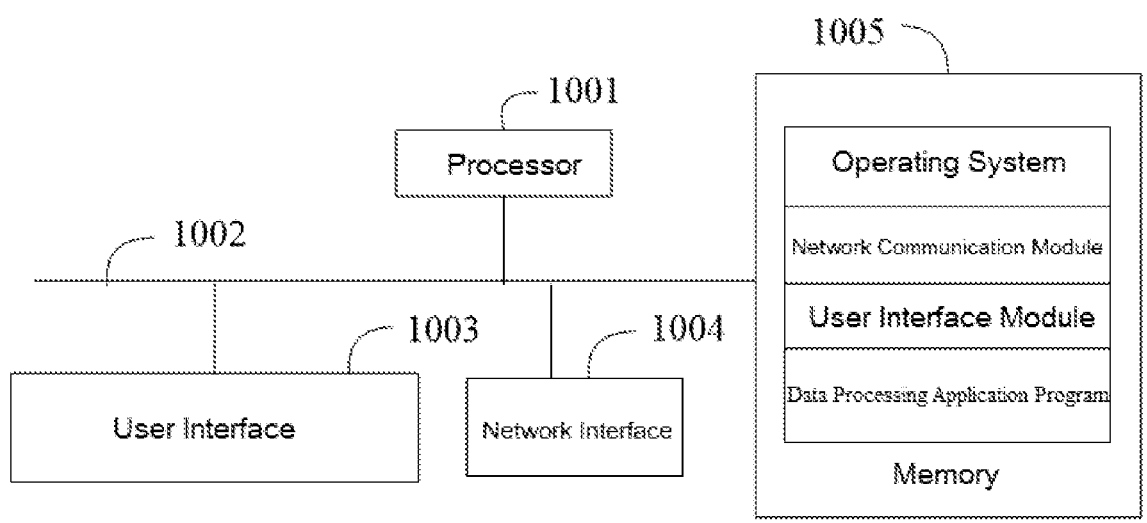
FIG. 1 is a schematic structural diagram of a display device of hardware running environment according to an embodiment of the present disclosure.

As shown in FIG. 1, FIG. 1 is a schematic structural diagram of a display device of hardware running environment according to an embodiment of the present disclosure.

As shown in FIG. 1, the display device may include a processor 1001, such as a CPU, a network interface 1004, a user interface 1003, a memory 1005, and a communication bus 1002, the communication bus 1002 is configured to realize connection communication between the these components. The user interface 1003 may include a display screen, an input unit such as a keyboard, and the optional user interface 1003 can further include a standard wired interface and a wireless interface. The network interface 1004 may optionally include a standard wired interface, a wireless interface (such as a WI-FI interface). The memory 1005 may be a SRAM memory or a non-volatile memory, such as a magnetic disk memory. The memory 1005 may optionally be a storage device that is independent from said processor 1001.

Optionally, the display device can further include a camera, a radio frequency (RF) circuit, a sensor, an audio circuit, and a WIFI module and the like.

Those skilled in the art will understand that the terminal structure shown in FIG. 1 is a limitation to the display device, more or fewer components can be included, or some components can be combined, or different components can be arranged.

As shown in FIG. 1, the memory 1005 which is used as a computer readable storage medium can include an operating system, a network communication module, a user interface module and a data processing application program.

In the display device shown in FIG. 1, the network interface 1004 is mainly configured to be connected to a background server and carry out data communication with the background server; the user interface 1003 is mainly configured to be connected with a client (user side) and carry out data communication with the client; the processor 1001 can be configured to call the data processing application program stored in the memory 1005 and execute the following operations:

acquiring color data of a display device, and reading a gray scale data of the color data in a first preset format;

reading the gray scale data of the color data in the first preset format and a second preset format after the display device enters white tracking adjustment.

Further, the processor 1001 may be configured to call the data processing application program stored in the memory 1005 and execute the following operations:

converting the gray scale data of the color data so as to be read in the first preset format which occupies storage space of 8 bit.

Further, the processor 1001 may be configured to call the data processing application program stored in the memory 1005 and execute the following operations:

reading the gray scale data of the color data in the second preset format which meets an occupied storage space of 5 bit.

Further, the processor 1001 may be configured to call the data processing application program stored in the memory 1005 and execute the following operations: the data reading formula of the second preset format is Dwt=a*Dm+d, and a is a constant, d≤32 or d≤2^5, Dwt is the gray scale data after entering the white tracking, and Dm is the gray scale data represented in the first format.

Further, the processor 1001 may be configured to call the data processing application program stored in the memory 1005 and execute the following operations:

determining a display mode of the current display device;

acquiring the color data of the display device, according to the display mode and a current displayed image.

Further, after the step of reading the gray scale data of the color data in the first preset format and the second preset format after the display device enters a white tracking adjustment mode, so as to reduce the storage space occupied by the gray scale data of the color data, the processor 1001 can be configured to call the data processing application program stored in the memory 1005, and execute the following operations:

determining a compression ratio of the gray scale data;

compressing the gray scale data according to the compression ratio, and storing the compressed gray scale data in the memory.

Further, the processor 1001 may be configured to call the data processing application program stored in the memory 1005 and execute the following operations:

acquiring a user's sensitivity of chrominance and sensitivity of brightness;

determining a compression ratio of the gray scale data, according to the sensitivity of the chrominance and the sensitivity of the brightness.

Further, the processor 1001 may be configured to call the data processing application program stored in the memory 1005 and execute the following operations:

after entering the white tracking, according to the converted gray scale data of the color data, enhancing the brightness of a red sub-pixel, and reducing the brightness of a blue sub-pixel.

Figure 2:
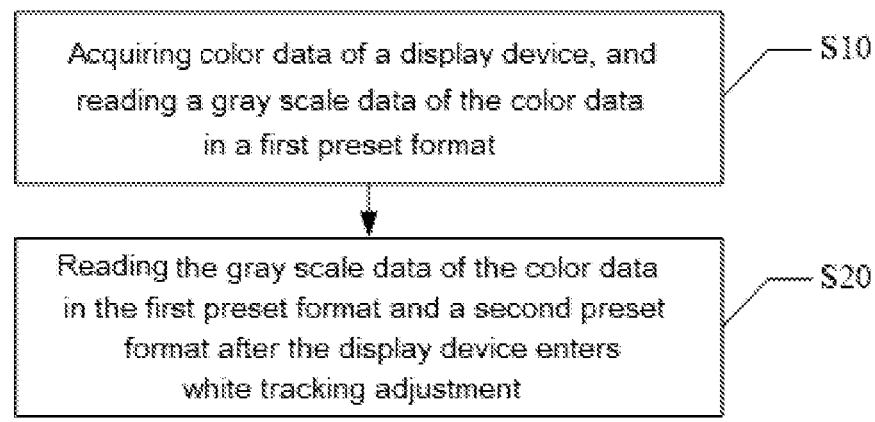
FIG. 2 is a schematic flow diagram of a method for processing data according to an embodiment of the present disclosure.

Referring to FIG. 2, an embodiment of the present disclosure provides a method for processing data, the method for processing data including:

S10, acquiring color data of a display device, and reading a gray scale data of the color data in a first preset format;

In this embodiment, the reason why a thin film transistor-liquid crystal display (TFT-LCD) is able to display different colors and images is that a plurality of R (red), G (green) and B (blue) sub-pixels are arranged in a panel, and the three sub-pixels can display different colors at different brightness. Due to the fact that the wavelength of the blue light is short, the attenuation of the B sub-pixels is relative smaller than that of the R sub-pixels and the G sub-pixels, as a result that a displayed image is cold, and the cold tone is not suitable for being watched by Asian people. Therefore, a white tracking (WT) technology can be used to enhance the brightness of the R sub-pixels and reduce the brightness of the B sub-pixels so as to weaken the status of cold image. Before entering the white tracking, color data of a display image of the display device is acquired, and the color data (RGB data) includes tinct data, chrominance data and/or gray scale data and the like. Before entering the white tracking, the gray scale data of the color data is represented in a first preset format. The first preset format may be a computer readable data format, for example, binary data or hexadecimal data or other formats defined by data size.

Optionally, converting the gray scale data of the color data so as to be read in the first preset format which occupies storage space of 8 bit, the first preset format is a format meeting the 8 bit condition, that is, the representation of the current gray scale data is not converted from 8 bit to 10 bit but continuously represented by 8 bit. The gray scale data of the color data before entering the white tracking is represented by Dm, and the size of Dm is 8 bit.

S20, reading the gray scale data of the color data in the first preset format and a second preset format after the display device enters white tracking adjustment.

After or before or meanwhile the gray scale data of the color data is converted into 8 bit data, whether the display device enters a white tracking mode is monitored, after the display device enters a white tracking adjustment, the representation manner of the gray scale data needs to be changed, and the storage space occupied by the gray scale data of the color data is reduced, and the gray scale data of the color data is read in the first preset format and the second preset format. The second preset format can be a numerical value or a data format recognized by a computer, such as binary or hexadecimal and the like, which meets the defined representation manner of occupied storage space.

Specifically, reading the gray scale data of the color data in the second preset format which meets occupied storage space of 5 bit. The data reading formula of the second preset format is: $Dwt=a*Dm+d$, and a is a constant, $d\leq 32$ or $d\leq 2^5$, Dwt is the gray scale data after entering the white tracking, and Dm is the gray scale data represented in the first format (a representation manner of the gray scale data before the white tracking is entered). The a can be 4 or other suitable values set according to requirements.

Dm represents gray scale data of the color data before entering the white tracking, and the occupied storage space is 8 bit. After entering the white tracking, the occupied storage space is 5 bit, and the occupied storage space is greatly reduced.

Figures 3, 4:
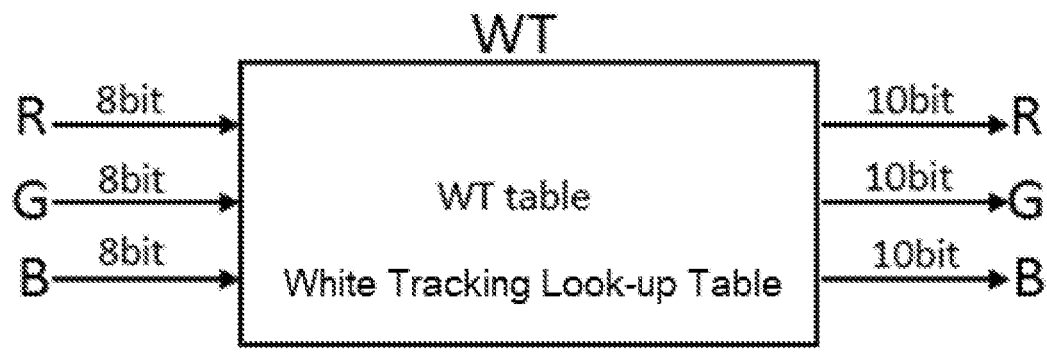
FIG. 3 is a schematic flow diagram of white tracking data storage according to an embodiment of the present disclosure.
FIG. 4 is a schematic diagram of data storage of a white tracking look-up table according to an embodiment of the present disclosure.

In an embodiment, FIG. 3 shows a function module diagram of the white tracking technology. FIG. 4 shows an example of a WT table (white tracking look-up table), each gray scale data of a red, green, or blue sub-pixel is changed from 8 bit into 10 bit, so that the amount of data is increased, and the calculation amount of the IC is increased.

Figure 5:
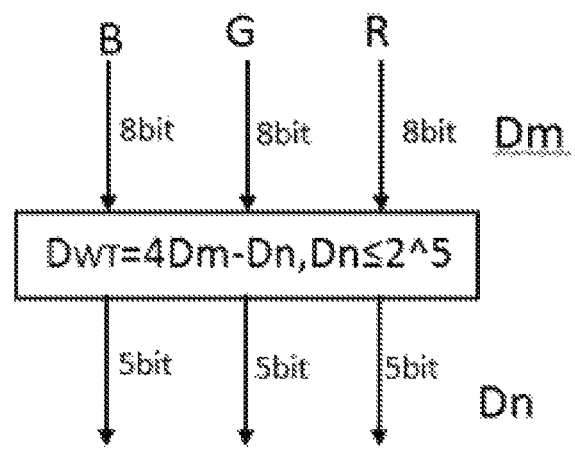
FIG. 5 is a schematic flow diagram of a calculation mode of the gray scale data of the color data in white tracking according to an embodiment of the present disclosure.
Figures 6, 7:
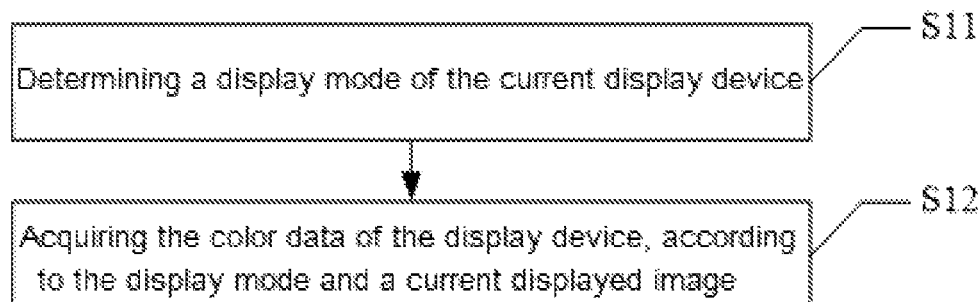
FIG. 6 is a schematic flow diagram of data storage of a white tracking look-up table according to another embodiment of the present disclosure.
FIG. 7 is a schematic flow diagram of acquiring color data of the display device according to an embodiment of the present disclosure.

FIG. 5 is a data calculation method according to an embodiment of the present disclosure, which reduces the occupied space of data storage. 4 times of the original 8 bit data Dm is reduced by Dn, $Dn\leq 2^5$, in this way, the data in the WT table can be represented according to the Dn. As shown in FIG. 6, subsequently stored Dn in the WT table is only 5 bit, which greatly reduces the data calculation amount and improves the calculation capacity of the driving IC.

In an embodiment of the present disclosure, due to the brightness of the R sub-pixels and the B sub-pixels after entering the white tracking, when the color data is acquired, only the color data of the R and B sub-pixels is acquired without acquiring the color data of G sub-pixels. The gray scale data of the color data of R and B sub-pixels is acquired, which further reduces the storage space occupied by the gray scale data of the color data.

According to the embodiment, the gray scale data of the color data is represented by the Dm in the first preset format before entering the white tracking, and after the white tracking is entered, the gray scale data representation of the first preset format and the second preset format are adopted, which further reduces the occupied storage space and effectively avoids the problem caused by the occupied space of the driving IC, which reduces the calculation difficulty of the driving IC, and the processing efficiency of the driving IC is improved.

In an embodiment, referring to FIG. 7, the step of acquiring the color data of the display device includes:

S11, determining a display mode of the current display device;

S12, acquiring the color data of the display device, according to the display mode and a current displayed image.

In this embodiment, the display device has a plurality of display modes, such as a high-definition mode, an energy-saving mode and the like, and the requirements of the colors and the gray scale data are different in different display modes. Therefore, the requirements for cold and warm colors are different in different display modes. When the color data is acquired, the display mode of the current display device is determined, and color data of the display device is acquired according to the display mode and the current displayed image. That is, corresponding to different display modes, the color data is difference in a certain degree, and the corresponding relation between the compensation values of the color data in different modes is established in advance, after the mode is determined, a corresponding compensation value is looked up according to the current mode so as to compensate for the acquired color data.

According to the embodiment, through the difference of display modes, a certain compensation is made to the color data in different display modes, so that the acquired color data is more accurate, and the white tracking can be well adjusted.

Figure 8:
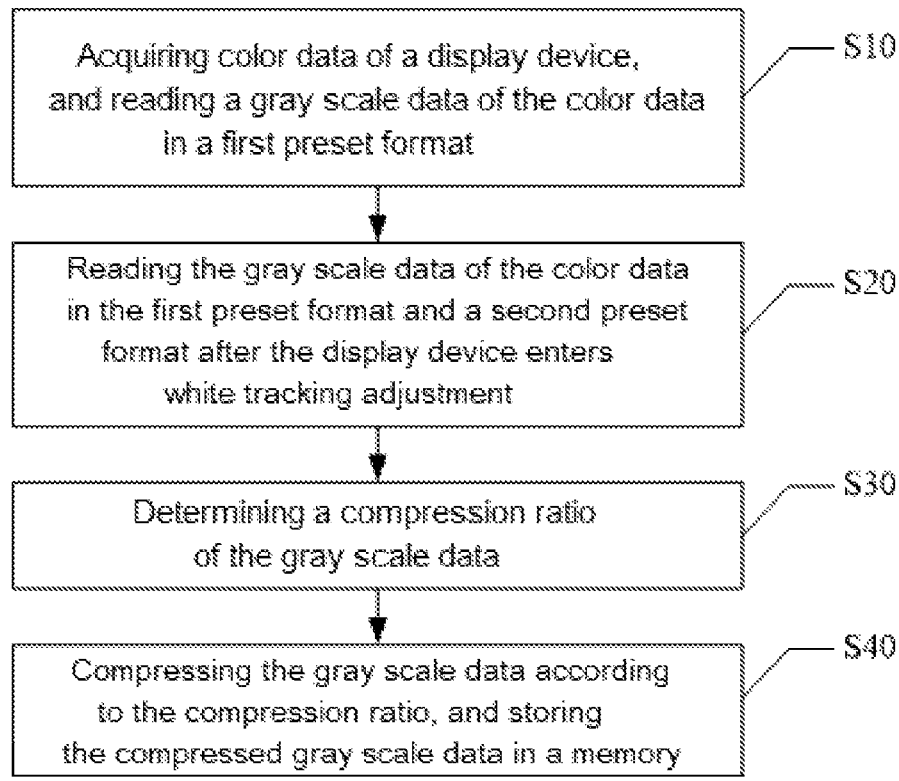
FIG. 8 is a schematic flow diagram of a method for processing data according to another embodiment of the present disclosure.

In an embodiment, referring to FIG. 8, after the step of reading the gray scale data of the color data in the first preset format and the second preset format after the display device enters a white tracking adjustment, so as to reduce the storage space occupied by the gray scale data of the color data, and the method further includes:

S30, determining a compression ratio of the gray scale data;

S40, compressing the gray scale data according to the compression ratio, and storing the compressed gray scale data in a memory.

In the previous embodiment, through adjusting the storage format, the storage space occupied by the gray scale data of the color data of an image displayed by the display device is reduced. In the embodiment, before the data is stored in the driving IC, the required storage data is compressed, and the proportion of compression is determined in advance, the gray scale data of the color data are compressed according to the compression ratio, and the storage space occupied for storing is further reduced.

Figure 9:
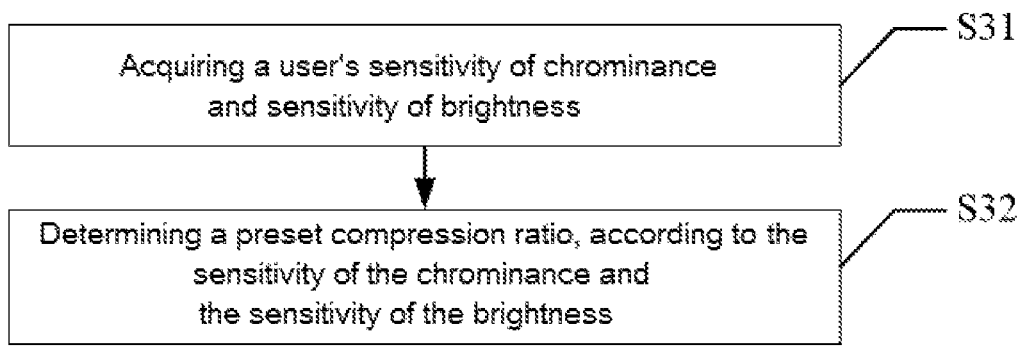
FIG. 9 is a schematic flow diagram of determining a data compression ratio according to an embodiment of the present disclosure.

Specifically, referring to FIG. 9, the determination mode of the compression ratio includes:

S31, acquiring a user's sensitivity of chrominance and sensitivity of brightness;

S32, determining a preset compression ratio, according to the sensitivity of the chrominance and the sensitivity of the brightness.

The characteristics of the human eyes show that the sensitivity of the brightness is far more higher than the sensitivity of the chrominance to the human eyes, i.e., firstly, the current user's sensitivity of chrominance and sensitivity of brightness is determined, and the preset compression ratio is determined according to the sensitivity of the chrominance and the sensitivity of the brightness, and a mapping relation between the sensitivity of the chrominance, the sensitivity of the brightness and the preset compression ratio is established in advance. For example, the sensitivity of the chrominance s1 and the sensitivity of the brightness 11 correspond to the compression ratio y1; the sensitivity of the chrominance s2 and the sensitivity of the brightness 12 correspond to the compression ratio y2. Through the sensitivity of the chrominance and the brightness, the preset compression ratio is determined, so that the compression ratio is more suitable.

In an embodiment of the present disclosure, referring to FIG. 10, the method further includes:

S50: after entering the white tracking, according to the converted gray scale data of the color data, enhancing the brightness of a red sub-pixel, and reducing the brightness of a blue sub-pixel.

The process of the embodiment is in a mode of adjusting the white tracking. The tone of R red color in the color displayed by the display device is warm, and the tone of B blue color is cold. and the two kinds of colors are required to be balanced. After the white tracking is entered, 5 bit of the gray scale data of the color data stored in the driving IC enhances the brightness of the R sub-pixels and reduces the brightness of the B sub-pixels; and the compensation is made on the basis of the gray scale data of the current color data according to the currently required tone. The mapping relation established in advance can be a look-up table, and the compensation value is determined according to the difference of the gray scale values. The compensation is carried out, and the difference of the tone is adjusted, so that the display effect is better, and the expectation of a user is met.

In an embodiment, in order to more accurately adjust a displayed tone, differences exist when setting the compensation values in different modes, and different compensation values are set according to different display modes.

It can be understood that in order to meet the requirements of different users, the user category is set in advance because the requirements of different users for the tone are different, and different compensation values are set according to the user category.

In an embodiment, a data decompression manner is stored in the driving IC. The gray scale data of the color data are decompressed according to previous compression of the data, and the operation of white tracking is completed according to the decompressed data. The tone of the display image is adjusted, and the expectation of the user is met.

In addition, the embodiment of the present disclosure further provides a display device, the display device includes a display panel and a time sequence controller connected with the display panel. A data processing control device is loaded in the time sequence controller, and the display panel completes the white tracking operation of display under the control of the time sequence controller. A data processing manner stored in the time sequence controller is completed according to the method for processing data in the embodiment mentioned above. The method for processing data is loaded in a data processing device, and the method is called and started by the time sequence controller to complete data processing, which reduces the storage space occupied by the data and reduces the cost. Moreover, the control efficiency of the time sequence controller is improved. The display device can be mobile or fixed display equipment such as a television, a mobile phone, a PAD, a machine-table displayer and the like. According to the display device of the embodiment, before entering the white tracking, the gray scale data of the color data is represented through a Dm in the first preset format, and after entering the white tracking, the gray scale data is represented in the first preset format and the second preset format, which further reduces the occupied storage space and effectively avoids the problem caused by the occupied space of the driving IC, which reduces the calculation difficulty of the driving IC and improves the processing efficiency of the driving IC.

In addition, the embodiment of the present disclosure further provides a computer readable storage medium, and a data processing program is stored in the computer readable storage medium. When the data processing program is executed by a processor, the method for processing data as described in the above embodiment is realized.

It should be noted that in this document, the term "comprising", "comprises" or any other variation thereof is intended to encompass a non-exclusive inclusion, such that a process, a method, an article or a system which includes a series of elements not only includes those elements but also includes other elements which are not explicitly listed, or further includes elements inherent to the process, the method, the article or the system. Under the condition that no more limitation exists, the statement "comprises a . . . " defines an element, and it is not excluded that additional identical elements further exist in the process, the method, the article or the system which includes said element.

The serial numbers of the embodiments of the present disclosure are merely for description, and do not represent good or bad of the embodiments.

Through the description of the above embodiments, those skilled in the art can clearly understand that the method can be realized by means of software and necessary general hardware platforms, and it is also possible to be realized through hardware, but in many cases, the former is a preferred embodiment. On the basis of such understanding, the technical solutions of the present disclosure are essentially, or the part which makes contributions to the prior art, can be embodied in the form of a software product. The computer software product is stored in a computer readable storage medium (such as a ROM/RAM, a magnetic disk and an optical disk) as described above which comprises a plurality of instructions which are used for enabling a terminal device (which can be a mobile phone, a computer, a server, an air conditioner, or a network device and the like) executes the method according to various embodiments of the present disclosure.

The embodiments above are preferably embodiments of the present disclosure, and the present disclosure is not limited to such embodiments, equivalent structure or process modification based on the specification and the drawing of the present disclosure, or directly or indirectly used in other related technical field, both are similarly within the protection scope of the present disclosure.

What is claimed is:

1. A method for processing data, wherein the method for processing data comprises the following steps:
    acquiring color data of a display device, and reading a gray scale data of the color data in a first preset format;
    reading the gray scale data of the color data in the first preset format and a second preset format after the display device enters white tracking adjustment;
    wherein a data reading formula of the second preset format is $Dwt=a*Dm+d$, a is a constant larger than 1, $d<0$, Dwt is the gray scale data after entering the white tracking, Dm is the gray scale data represented in the first format, a storage space occupied by the gray scale data after entering the white tracking Dwt is smaller than a storage space occupied by the gray scale data represented in the first format Dm.

2. The method for processing data according to claim 1, wherein the step of representing the gray scale data of the color data in a first preset format comprises:
    converting the gray scale data of the color data so as to be read in the first preset format which occupies storage space of 8 bit.

3. The method for processing data according to claim 1, wherein the step of reading the gray scale data of the color data in the first preset format and a second preset format comprises:
    reading the gray scale data of the color data in the second preset format which meets an occupied storage space of 5 bit.

4. The method for processing data according to claim 3, wherein after the step of reading the gray scale data of the color data in the first preset format and a second preset format after the display device enters white tracking adjustment, the method further comprises:
    acquiring a user's sensitivity of chrominance and sensitivity of brightness;
    determining a compression ratio of the gray scale data, according to the sensitivity of the chrominance and the sensitivity of the brightness;
    compressing the gray scale data according to the compression ratio, and storing the compressed gray scale data in a memory.

5. The method for processing data according to claim 1, wherein the step of acquiring color data of a display device comprises:
    determining a display mode of the current display device;
    acquiring the color data of the display device, according to the display mode and a current displayed image.

6. The method for processing data according to claim 1, wherein after the step of reading the gray scale data of the color data in the first preset format and a second preset format after the display device enters white tracking adjustment, the method further comprises:
    determining a compression ratio of the gray scale data;
    compressing the gray scale data according to the compression ratio, and storing the compressed gray scale data in a memory.

7. The method for processing data according to claim 6, wherein the step of determining a compression ratio of the gray scale data comprises:
    acquiring a user's sensitivity of chrominance and sensitivity of brightness;
    determining the compression ratio of the gray scale data, according to the sensitivity of the chrominance and the sensitivity of the brightness.

8. The method for processing data according to claim 1, wherein the method further comprises:
    after entering the white tracking, according to the converted gray scale data of the color data, enhancing the brightness of red sub-pixel, and reducing the brightness of blue sub-pixel.

9. The method for processing data according to claim 1, wherein the method further comprises:
    acquiring the color data of red sub-pixel and blue sub-pixel, and skip acquiring the color data of green sub-pixel when acquiring the color data.

10. A display device, wherein the display device comprises: a memory, a processor, and a computer program stored on the memory and capable of running on the processor, when the computer program is executed by the processor, the following steps are realized:
    color data of a display device is acquired, and gray scale data of the color data is read in a first preset format;
    the gray scale data of the color data is read in the first preset format and a second preset format after the display device enters white tracking adjustment;
    wherein a data reading formula of the second preset format is $Dwt=a*Dm+d$, a is a constant larger than 1, $d<0$, Dwt is the gray scale data after entering the white tracking, Dm is the gray scale data represented in the first format, a storage space occupied by the gray scale data after entering the white tracking Dwt is smaller than a storage space occupied by the gray scale data represented in the first format Dm.

11. A computer readable storage medium, wherein a data processing program is stored on the computer readable storage medium, when the data processing program is executed by the processor, the following steps are realized:

color data of a display device is acquired, and gray scale data of the color data is read in a first preset format;

the gray scale data of the color data is read in the first preset format and a second preset format after the display device enters white tracking adjustment;

wherein a data reading formula of the second preset format is Dwt=a*Dm+d, a is a constant larger than 1, d<0, Dwt is the gray scale data after entering the white tracking, Dm is the gray scale data represented in the first format, a storage space occupied by the gray scale data after entering the white tracking Dwt is smaller than a storage space occupied by the gray scale data represented in the first format Dm.

\* \* \* \* \*